US008805471B2

(12) United States Patent
Sakuragi

(10) Patent No.: US 8,805,471 B2
(45) Date of Patent: Aug. 12, 2014

(54) SURGERY-ASSISTANCE APPARATUS, METHOD AND PROGRAM

(75) Inventor: Futoshi Sakuragi, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 240 days.

(21) Appl. No.: 13/396,188

(22) Filed: Feb. 14, 2012

(65) Prior Publication Data

US 2012/0209103 A1 Aug. 16, 2012

(30) Foreign Application Priority Data

Feb. 15, 2011 (JP) ................... 2011-029774

(51) Int. Cl.
A61B 5/00 (2006.01)

(52) U.S. Cl.
USPC .......................................... 600/407; 600/425

(58) Field of Classification Search
USPC .................................................. 600/407, 425
See application file for complete search history.

(56) References Cited

U.S. PATENT DOCUMENTS

| 2002/0181754 A1 | 12/2002 | Masumoto et al. |
| 2003/0095692 A1 | 5/2003 | Mundy et al. |
| 2003/0179915 A1 | 9/2003 | Goto |
| 2004/0120561 A1 | 6/2004 | Goto |
| 2010/0316268 A1 | 12/2010 | Liang et al. |

FOREIGN PATENT DOCUMENTS

| JP | 2001-137230 A | 5/2001 |
| JP | 2001-283191 A | 10/2001 |
| JP | 2003-033349 A | 2/2003 |
| JP | 2003-271924 A | 9/2003 |
| JP | 2003-339644 A | 12/2003 |
| JP | 2007-054147 A | 3/2007 |
| JP | 2008-253293 A | 10/2008 |
| JP | 4193201 B2 | 10/2008 |
| JP | 2008289916 A | 12/2008 |
| WO | 2010132606 A1 | 11/2010 |

OTHER PUBLICATIONS

Japanese Office Action Application No. 2011-029774; Jan. 8, 2013.
European Search Report for Application No. 12155221; Jun. 19, 2012.
"Fully Automatic Anatomical, Pathological, and Functional Segmentation from CT Scans for Hepatic Surgery"; Luc Soler, et al.; Computer Aided Surgery, vol. 6, Jan. 1, 2001; pp. 131-142.
"Intraoperative adaptation and visualization of preoperative risk analysis of oncologic liver surgery"; Christian Hansen, et al; Proceedings of SPIE, vol. 6918, Jan. 1, 2008; pp. 691809-691809-10.

(Continued)

Primary Examiner — Peter Luong
(74) Attorney, Agent, or Firm — Sughrue Mion, PLLC

(57) ABSTRACT

A smallest enclosing body that encloses an abnormal region is set. A part of an organ, and the part belonging to the inside of an elliptic parabolic surface or a circular conic surface that circumscribes the set enclosing body, is extracted as a partial region. A region of a structure dominating the organ is extracted from the obtained medical image. A part of the organ, and the part including the abnormal region and being dominated by a part of the structure extending from a predetermined position in the extracted region of the structure toward the part of the organ including the abnormal region, is extracted as a dominance region. The partial region or the dominance region is determined as the excision region based on a predetermined excision region determination condition.

12 Claims, 6 Drawing Sheets

(56) References Cited

OTHER PUBLICATIONS

"Importance-Drive Structure Categorization for 3D Surgery Planning", A. Baer, et al.; Eurographics Workshop on Visual Computing for Biology and Medicine, Jan. 1, 2010.

"GPU-based smart visibility techniques for tumor surgery planning", Christoph Kubisch, et al.; International Journal of Computer assisted Radiology and surgery; vol. 5, No. 6, Apr. 29, 2010; pp. 667-678.

"Liver Surgery Planning Using Virtual Reality", Bernhard Retinger, et al., Virtual and Augmented Reality Supported Simulators, Jan. 1, 2006, pp. 36-47.

D. Kobayashi, et al., "Trial of Branch Base Tree Structure Model Construction for Blood Vessel.Geometric Representation", RIKEN, RIKEN Symposium on Research on Digitization of Biological Sample's Shape and Construction of its Database, 2005, pp. 84-92.

H. Fujita, et al., "Intelligent Computer-Aided Diagnosis Based on Normal Structure Recognition of Human Body", Grant-in-Aid for Scientific Research, granted by the Ministry of Education, Culture, Sports, Science and Technology (MEXT), Study in Specific Field "Intellectual Diagnosis Aid of Multi-Dimensional Medical Image" Proceedings of the 4th Symposium 2007 pp. 55-60.

K. Kubota et al., "Evaluation of Computer-Aided Diagnosis System for Lung Cancer Based on Helical CT Images", the Institute of Electronics, Information and Communication Engineers (IEICE), IEICE Technical Report, 2001, pp. 41-46, vol. 101, No. 310.

R. Beichel, et al., "Liver Segment Approximation in CT Data for Surgical Resection Planning", Medical Imaging, 2004, Proceedings of the SPIE, pp. 1435-1446, vol. 5370.

S. Kido et al., "Intelligent CAD for Diffuse Lung Diseases", Grant-in-Aid for Specific Research, granted by the Ministry of Education, Culture, Sports, Science and Technology, (MEXT), Study in Specific Field "Intellectual Diagnosis Aid of Multi-Dimensional Medical Image", Proceedings of the 4th Symposium, 2007 pp. 45-54.

S. Nakamura, et al., "Automated Classification of Pulmonary Artery and Bein from Chest X-ray CT Images by Tree Structure Analysis", Technical Report of the Institute of Electronics Information and Communication Engineers (IEICE), MI, Medical Image, Japan, IEICE, 2006, pp. 105-108, vol. 105, No. 580.

Y. Hirano, et al., "Quantification of Shrinkage of Lung Lobes in Chest CT Images Using the 3D Voronoi Division and Application to Tumor Discrimination", Proceedings of the 20th Annual Conference of the Japanese Society of Medical Imaging Technology, 2001, pp. 315-316.

Y. Wakida, et al., "Liver Cancer Detection Based on a Temporal Density Feature from Abdominal Dynamic X-ray CT Images", Journal of Computer Aided Diagnosis of Medical Images, 2007, pp. 1-10, vol. 10, No. 1.

US 8,805,471 B2

SURGERY-ASSISTANCE APPARATUS, METHOD AND PROGRAM

BACKGROUND OF THE INVENTION

1. Field of the Invention

The present invention relates to a surgery-assistance apparatus, method and program for assisting doctors in determining excision regions to be removed in surgeries of organs, such as a liver and a lung.

2. Description of the Related Art

When a surgery is performed on a patient to remove a diseased part of his/her organ, such as a liver and a lung, doctors need to appropriately determine a part to be removed, in advance, by performing diagnosis based on images before the surgery. To determine the part to be removed, a method in which a partial region including the diseased part is set and the partial region is determined as an excision region is used. Further, a method in which a dominance region, which is dominated by a part of a structure to be removed, is extracted based on the structure that dominates an organ, specifically, based on the structure that supplies oxygen and nutrition to the organ to keep the normal function of the organ, and the dominance region is determined as an excision region is used.

As the method for determining the partial region including the diseased part as the excision region, Japanese Patent No. 4193201 (Patent Document 1) discloses a method in which a lesion region in a liver is extended, based on the lesion region and plural vessels running in the liver, spherically from the center or the center of gravity of the lesion region toward the outside of the lesion region until the extended lesion region becomes in contact with at least one of the plural vessels, and a substantially circular conic region in contact with the extended spherical region is determined as the excision region.

Further, as the method for determining the dominance region as the excision region, Japanese Unexamined Patent Publication No. 2007-054147 (Patent Document 2) proposes a method in which blood vessels, a liver parenchyma, and a tumor part are extracted from an X-ray CT image of the liver of a patient. Further, a blood vessel that dominates a region to which the extracted tumor belongs is identified based on the positions of the core lines of the extracted blood vessels, the diameters of the blood vessels or the like. Accordingly, a blood vessel that supplies nutrition to the tumor is identified. Further, in the region dominated by the identified blood vessel, a region in which a relative distance between voxels constituting a blood vessel and voxels constituting the liver parenchyma is longer than a predetermined maximum relative distance value is displayed as an abnormal perfusion region that might have been erroneously identified due to a mass effect on the blood vessel or the like.

Here, it is desirable that the excision region is appropriately determined so that a burden of a surgery on a patient and an operation time of the surgery are reduced. For example, it is desirable that the area of the boundary of the excision region is as small as possible to reduce a burden of a surgery on a patient and the operation time of the surgery. Further, it is desirable that the volume of the excision region is minimized so that the healthy normal organ of the patient remains as much as possible. Further, it is desirable to appropriately consider the influence of dominance by the structure to determine the excision region.

However, in the method disclosed in Patent Document 1, the partial region is always determined as the excision region. Therefore, the volume of the excision region and the surface area of excision are larger than the case of determining the dominance region as the excision region in some cases. Further, the influence of dominance by the structure is not considered. Therefore, it is impossible to determine, as the excision region, the dominance region or the partial region that is more appropriate as the excision region.

Further, in the method disclosed in Patent Document 2, the dominance region is always determined as the excision region. Therefore, the volume of the excision region and the surface area of excision are larger than the case of determining the partial region as the excision region in some cases. Hence, it is impossible to determine, as the excision region, the dominance region or the partial region that is more appropriate as the excision region.

SUMMARY OF THE INVENTION

In view of the foregoing circumstances, it is an object of the present invention to provide a surgery-assistance apparatus, method and program that can appropriately determine, as an excision region, a dominance region or a partial region. Further, it is another object of the present invention to assist doctors (surgeons, radiologists, or the like) in diagnosis by presenting an appropriate excision region so that they can easily judge whether the excision region is appropriately set.

A surgery-assistance apparatus of the present invention is a surgery-assistance apparatus that determines an excision region including an abnormal region of an organ to be removed, the apparatus comprising:

a medical image obtainment means that obtains a medical image representing the organ:

an organ region extraction means that extracts a region of the organ from the obtained medical image;

an abnormal region extraction means that extracts the abnormal region from the extracted region of the organ;

an enclosing body setting means that sets a smallest enclosing body that encloses the extracted abnormal region;

a partial region extraction means that extracts, as a partial region, a part of the organ, and the part belonging to the inside of an elliptic parabolic surface or a circular conic surface that circumscribes the set enclosing body;

a structure region extraction means that extracts a region of a structure dominating the organ from the obtained medical image;

a dominance region extraction means that extracts, as a dominance region, a part of the organ, and the part including the abnormal region and being dominated by a part of the structure extending from a predetermined position in the extracted region of the structure toward the part of the organ including the abnormal region; and an excision region determination means that determines, based on a predetermined excision region determination condition, the partial region extracted by the partial region extraction means or the dominance region extracted by the dominance region extraction means, as the excision region.

A surgery-assistance method of the present invention is a surgery-assistance method that determines an excision region including an abnormal region of an organ to be removed, the method comprising the steps of:

obtaining a medical image representing the organ:

extracting a region of the organ from the obtained medical image;

extracting the abnormal region from the extracted region of the organ;

setting a smallest enclosing body that encloses the extracted abnormal region;

extracting, as a partial region, a part of the organ, and the part belonging to the inside of an elliptic parabolic surface or a circular conic surface that circumscribes the set enclosing body;

extracting a region of a structure dominating the organ from the obtained medical image;

extracting, as a dominance region, a part of the organ, and the part including the abnormal region and being dominated by a part of the structure extending from a predetermined position in the extracted region of the structure toward the part of the organ including the abnormal region; and determining, based on a predetermined excision region determination condition, the partial region extracted by the partial region extraction means or the dominance region extracted by the dominance region extraction means, as the excision region.

A surgery-assistance program of the present invention is a surgery-assistance program that determines an excision region including an abnormal region of an organ to be removed, the program causing a computer to function as:

a medical image obtainment means that obtains a medical image representing the organ;

an organ region extraction means that extracts a region of the organ from the obtained medical image;

an abnormal region extraction means that extracts the abnormal region from the extracted region of the organ;

an enclosing body setting means that sets a smallest enclosing body that encloses the extracted abnormal region;

a partial region extraction means that extracts, as a partial region, a part of the organ, and the part belonging to the inside of an elliptic parabolic surface or a circular conic surface that circumscribes the set enclosing body;

a structure region extraction means that extracts a region of a structure dominating the organ from the obtained medical image;

a dominance region extraction means that extracts, as a dominance region, a part of the organ, the part including the abnormal region and being dominated by a part of the structure extending from a predetermined position in the extracted region of the structure toward the part of the organ including the abnormal region; and an excision region determination means that determines, based on a predetermined excision region determination condition, the partial region extracted by the partial region extraction means or the dominance region extracted by the dominance region extraction means, as the excision region.

In the present invention, a medical image is a three-dimensional anatomical image (3D anatomical image, or 3D morphological image), which three-dimensionally represents the structure of an organ. Further, a three-dimensional functional image (3D Functional Image) may be obtained in addition to the 3D anatomical image. In the 3D functional image, evaluation values for evaluating the function of the organ are three-dimensionally arranged in the shape of the organ. Specifically, medical images are obtained from an internal memory or storage of a computer that functions as a surgery-assistance apparatus. Alternatively, medical images are obtained from an external storage directly connected to the computer, or an external storage connected to the computer through a network. The 3D functional image is volume data composed of voxel data representing evaluation values (for example, values representing the motion or physiological reactions of the organ) that are used to evaluate whether the function of the organ is normal. Meanwhile, the 3D anatomical image is volume data composed of voxel data representing the anatomical structure of the organ.

Various known techniques are applicable to detection of an abnormal region as long as an abnormality enclosed in the organ is detectable. Specific techniques for detecting a lung cancer are disclosed in U.S. Patent Application Publication No. 20030095692, Japanese Unexamined Patent Publication No. 2003-271924, and K. Kubota et al., "Evaluation of Computer-Aided Diagnosis system for Lung Cancer based on Helical CT images", the Institute of Electronics, Information and Communication Engineers (IEICE), IEICE Technical Report, pp. 41-46, 2001 is applicable. Further, consolidation disclosed in S. Kido et al., "Intelligent CAD for diffuse lung diseases", Grant-in-Aid for Scientific Research, granted by the Ministry of Education, Culture, Sports, Science and Technology (MEXT), Study in Specific Field "Intellectual Diagnosis Aid of Multi-Dimensional Medical Image", Proceedings of 4th Symposium, pp. 45-54, 2007 is applicable. Further, Ground-Glass Opacity (GGO) and Crazy-Paving are applicable. Further, detection techniques of diffuse lung disease, such as honeycomb-shaped shadow, pulmonary emphysema shadow and particle-shaped shadow, are applicable. Further, a technique for detecting a liver cancer disclosed in Y. Wakida et al., "Liver Cancer Detection based on a Temporal Density Feature from Abdominal Dynamic X-ray CT Images", Journal of Computer Aided Diagnosis of Medical Images, Vol. 10, No. 1, pp. 1-10, 2007 is applicable. Further, a technique for detecting hepatocellular carcinoma, hepatic cyst, hepatic hemangioma, and bleeding in a liver region disclosed in H. Fujita et al., "Intelligent Computer-aided Diagnosis Based on Normal Structure Recognition of Human Body", Grant-in-Aid for Scientific Research, granted by the Ministry of Education, Culture, Sports, Science and Technology (MEXT), Study in Specific Field "Intellectual Diagnosis Aid of Multi-Dimensional Medical Image", Proceedings of 4th Symposium, pp. 55-60, 2007 and the like are applicable.

The term "enclosing body" refers to a closed three-dimensional object (body) that completely encloses a part of a region in the inside thereof. The enclosing body may be in any shape as long as the enclosing body is a closed three-dimensional object that completely encloses an abnormal region. However, since an abnormal region of a liver, a lung or the like is extracted as a substantially spherical region in many cases, it is desirable that the shape of the enclosing body is, for example, a sphere, an ellipse, or the like.

The expression "a smallest enclosing body that encloses an abnormal region" may be defined in an arbitrary manner as long as the abnormal region is enclosed. For example, an enclosing body that circumscribes the abnormal region may be defined as the smallest enclosing body. Alternatively, as disclosed in Patent Document 1, a sphere that includes the abnormal region, and that has been extended to reach a structure, such as a blood vessel, may be defined as the smallest enclosing body.

The expression "dominates the organ" means keeping the function of the organ normal by supplying oxygen and nutrition to the organ. For example, if the organ is a liver, a blood vessel or vessels correspond to a structure that dominates the organ. If the organ is a lung or lungs, a bronchus or bronchi correspond to a structure that dominates the organ. If the organ is a brain, a cerebral artery corresponds to a structure that dominates the organ.

The expression "a distance from a predetermined point present in the abnormal region to a surface of the region of the organ" refers to a distance from a representative position in the abnormal region, which represents the position of the abnormal region, to the surface of the organ. For example, the distance may be a shortest distance from the center of gravity of the inside of the abnormal region to the surface of the organ. Alternatively, the distance may be a distance from a point on the surface of the organ to the center of the abnormal region when a straight line that passes through the center of gravity of the abnormal region and is parallel to a normal to the surface of the organ crosses the surface of the organ at the point. Further, a group of plural abnormal regions may be regarded as a single abnormal region, and the center of gravity of the group of plural abnormal regions, as the single abnormal region, may be used as the predetermined point. When a group of plural abnormal regions is regarded as an abnormal region, or when the shape of an abnormal region is long and narrow, the center of gravity of the abnormal region or regions may be present on the outside of the abnormal region or regions. Therefore, it is not necessary that the predetermined point present in the abnormal region is located in the abnormal region or regions. The predetermined point present in the abnormal region may be located in the vicinity of the abnormal region, which is substantially regarded as an abnormal region.

Further, a region of an organ, a region of a structure, and a dominance region may be extracted by calculation using a known method. For example, if the organ is a liver, a dominance region can be identified by using the following method. First, blood vessels in the liver region are extracted, and blood vessels that dominate regions in the liver region (liver parenchyma or the like) other than the blood vessels are identified by using a Voronoi diagram. Accordingly, regions dominated by respective blood vessels are identified as liver segments (please refer to Japanese Unexamined Patent Publication No. 2003-033349, R Beichel et al., "Liver Segment Approximation in CT Data for Surgical Resection Planning", Medical Imaging 2004: Image Processing, Edited by Fitzpatrick, J. Michael; Sonka, Milan, Proceedings of the SPIE, Volume 5370, pp. 1435-1446, 2004 and the like).

Further, if the region is a lung field, a dominance region may be determined by using the following method. First, a set of voxels in a bronchus region is extracted by using a region growing method, and thinning processing is performed on the extracted bronchus region. Further, voxels on the obtained thin lines representing bronchi are classified, based on the connection relationships between the thin lines, into end points, edges (sides) and branch points. Accordingly, tree structure data representing the bronchi are obtained (for details, please refer to D. Kobayashi et al., "Trial of Branch Base Tree Structure Model Construction for Blood Vessel Geometric Representation", RIKEN, RIKEN Symposium on Research on Digitization of Biological Sample's Shape and Construction of its Database, pp. 84-92, 2005 [search conducted on Jan. 6, 2010], Internet (URL: http://www.compbio.riken.jp/keijyo/products/2005_1_files/kobayashi_print-.pdf), S. Nakamura et al., "Automated Classification of Pulmonary Artery and Vein from Chest X-ray CT Images by Tree Structure Analysis", Technical Report of the Institute of Electronics, Information and Communication Engineers (IEICE), MI, Medical Image, Japan, IEICE, Vol. 105, No. 580, pp. 105-108, 2006 [search conducted on Nov. 20, 2009], Internet (URL: http://www.murase.nuie.nagoya-u.ac.jp/~ide/res/paper/J05-kenkyukai-snaka-1.pdf), and the like). Further, three-dimensional Voronoi division is performed by using, as a set of seed points, the obtained structure of the bronchus. The three-dimensional Voronoi division is performed to find out to which bronchus constituting the bronchus structure each voxel in a lung region is closest. In other words, the three-dimensional Voronoi division is performed to find out bronchi that dominate respective voxels in the lung region. Accordingly, a region dominated by the same bronchus is determined as a dominance region of the bronchus (for details, please refer to Y. Hirano et al., "Quantification of shrinkage of lung lobes in chest CT images using the 3D Voronoi division and application to tumor discrimination", Proceedings of the 20th Annual Conference of the Japanese Society of Medical Imaging Technology, pp. 315-316, 2001 [search conducted on Nov. 20, 2009], Internet (URL: http://mase.itc.nagoya-u.ac.jp/~hirano/Papers/JAMIT2001.pdf), and the like). Further, as other examples, Japanese Unexamined Patent Publication No. 2001-137230 and Japanese Unexamined Patent Publication No. 2008-253293 disclose techniques for extracting a lung field. Further, Japanese Unexamined Patent Publication No. 2001-283191 and U.S Patent Application Publication No. 20020181754 disclose techniques for extracting a liver. These techniques are also applicable.

The "dominance region" is a region of an organ. The dominance region is dominated by a part of a structure, such as a blood vessel, and the part of the structure extends from a predetermined position in the region of the structure, in other words, from a part of the structure toward a part of the organ, and the part of the organ includes the diseased part to be removed in a surgery. Generally, when a surgery is performed to excise an organ, such as a liver and a lung, which is dominated by a specific structure, such as a blood vessel and a bronchus, a position at which the structure, such as the blood vessel and the bronchus, which dominates the organ, is ligated is determined. Further, a part of the organ dominated by a part of the structure extending from the position at which the structure is ligated toward the diseased part side is regarded as the dominance region, and excised. Here, the predetermined position in the region of the structure corresponds to the position at which the structure dominating the organ is ligated. Further, the term "a part of the structure" refers to a part extending from the position at which the structure, such as a blood vessel, is ligated toward the organ including the diseased part, in other words, toward the distal end of a branch in the structure, such as the blood vessel.

Further, a part of the structure, the part extending from a predetermined position in the region of the structure toward the part of the organ, the part including the diseased part, may be set by using various known techniques. For example, the technique disclosed in Japanese Unexamined Patent Publication No. 2001-283191 may be used. A structure may be displayed on a display device, and an input specifying a predetermined position in the structure by a manual operation of a user may be received. Further, a region extending from the predetermined position toward the organ including the diseased part may be set as the part of the structure.

In the surgery-assistance apparatus of the present invention, the excision region determination condition may be an arbitrary condition as long as the condition regulates a condition that can appropriately determine an excision region. Further, arbitrary plural conditions may be set in combination. For example, when a distance from a predetermined point present in the abnormal region to a surface of the region of the organ is less than or equal to a predetermined threshold value, the excision region may be determined by weighting the partial region and the dominance region in such a manner to give a priority to the partial region. When the distance from the predetermined point present in the abnormal region to the surface of the region of the organ is greater than the predetermined threshold value, the excision region may be determined by weighting the partial region and the dominance region in such a manner to give a priority to the dominance region.

Further, in the surgery-assistance apparatus of the present invention, the excision region determination condition may determine the excision region by weighting the partial region and the dominance region in such a manner to give a priority to one of the partial region and the dominance region that has a smaller volume or surface area.

Further, in the surgery-assistance apparatus of the present invention, the excision region determination condition may determine the excision region by weighting the partial region and the dominance region in such a manner to give a priority to the dominance region when the partial region encloses the structure.

Further, in the surgery-assistance apparatus of the present invention, it is desirable that the partial region extraction means calculates, as the partial region, a region belonging to the inside of the elliptic parabolic surface or the circular conic surface that circumscribes the set enclosing body, and the volume or the surface area of the region being smallest.

In the surgery-assistance apparatus of the present invention, the abnormal region extraction means can extract plural abnormal regions. When at least two of the extracted plural abnormal regions are located within a predetermined distance from each other, the enclosing body setting means may set a smallest enclosing body that encloses all of the at least two of the extracted plural abnormal regions that are located within the predetermined distance.

The surgery-assistance apparatus of the present invention may further include an alert means that issues an alert when the structure is present in the extracted partial region.

The alert may be issued by the alert means in any manner as long as users can identify or notice the alert. For example, the alert may be issued by sound. Alternatively, an alert may be displayed on a display screen. For example, a structure in the partial region may be displayed in an identifiable manner, and various identification methods may be adopted to make users distinguish the region of the structure in the partial region from the other region. For example, the region of the structure in the partial region may be displayed in a different color from the other region, or blinked. Alternatively, a thicker line may be used for the contour of the region of the structure in the partial region.

In the surgery-assistance apparatus of the present invention, the medical image obtainment means may further obtain a functional image representing a function level at each position of the organ, and the dominance region extraction means may extract the dominance region by using a distance weighted based on the function level at each position on a shortest path between each part of the organ and each part of the structure in the medical image.

Further, the term "functional image" refers to the aforementioned three-dimensional functional image.

Further, the expression "extract the dominance region by using a distance weighted based on the function level at each position on a shortest path between each part of the organ and each part of the structure" refers to a method in which the dominance region is extracted in such a manner that each part of the organ is dominated by a structure (for example, a blood vessel) that has the shortest distance from the respective parts of the organ. In the method, the distance is not limited to a distance based on the physical positions of each part of the organ and each part of the structure. The distance is weighted based on the function level of the part of the organ present on a shortest path between each part of the organ and each part of the structure. For example, when the organ is a liver, and two blood vessels run through the liver, equidistant positions in the liver parenchyma from each part of the two blood vessels are determined as the boundary of the dominance region. Here, a distance between a position in the liver parenchyma and a part of one of the two blood vessels is calculated by weighting a physical shortest distance between the position in the liver parenchyma and the part of the one of the two blood vessels based on the liver function level of each part of the liver parenchyma present on the shortest distance path between the position in the liver parenchyma and the part of the one of the two blood vessels. Further, a distance between a position in the liver parenchyma and a part of the other one of the two blood vessels is calculated by weighting a physical shortest distance between the position in the liver parenchyma and the part of the other one of the two blood vessels based on the liver function level of each part of the liver parenchyma present on the shortest distance path between the position in the liver parenchyma and the part of the other one of the two blood vessels.

In the present invention, the organ may be a liver, and the structure may be a blood vessel. Alternatively, the organ may be a lung, and the structure may be a bronchus.

According to a surgery-assistance apparatus, method and program of the present invention, a smallest enclosing body that encloses an abnormal region is set, and a part of an organ, and the part belonging to the inside of an elliptic parabolic surface or a circular conic surface that circumscribes the set enclosing body, is extracted as a partial region. Further, a region of a structure dominating the organ is extracted from the obtained medical image. Further, a part of the organ, and the part including the abnormal region and being dominated by a part of the structure extending from a predetermined position in the extracted region of the structure toward the part of the organ including the abnormal region, is extracted as a dominance region. Further, the partial region extracted by the partial region extraction means or the dominance region extracted by the dominance region extraction means is determined as an excision region based on a predetermined excision region determination condition. Therefore, the more appropriate one of the partial region and the dominance region can be determined as an excision region based on the predetermined excision region determination condition. Accordingly, doctors and radiographers can easily set a region of an organ that should be actually excised.

In the surgery-assistance apparatus of the present invention, the excision region determination condition may determine the excision region by weighting the partial region and the dominance region in such a manner to give a priority to the partial region when a distance from a predetermined point present in the abnormal region to a surface of the region of the organ is less than or equal to a predetermined threshold value. Further, the predetermined excision region determination condition may determine the excision region by weighting the partial region and the dominance region in such a manner to give a priority to the dominance region when the distance from the predetermined point present in the abnormal region to the surface of the region of the organ is greater than the predetermined threshold value. In such a case, the more appropriate one of the partial region and the dominance region can be determined as an excision region based on the distance from the abnormal region to the surface region. Accordingly, doctors and radiographers can easily set a region of an organ that should be actually excised.

In the present invention, when the excision region determination condition determines the excision region by weighting the partial region and the dominance region in such a manner to give a priority to one of the partial region and the dominance region that has a smaller volume or surface area, the excision region is determined in such a manner to give a priority to the partial region or the dominance region that has a smaller volume or boundary surface to be excised. Therefore, it is possible to determine the excision region having a smaller boundary surface to be excised. Accordingly, it is possible to easily set a region of an organ that should be actually excised in such a manner that the set region is appropriate to reduce a burden of a surgery on a patient and to reduce the operation time of the surgery.

In the present invention, when the excision region determination condition determines the excision region by weighting the partial region and the dominance region in such a manner to give a priority to the dominance region when the partial region encloses the structure, the excision region is determined in such a manner to give a priority to the dominance region dominated by the structure than the partial region including the structure. Therefore, it is possible to prevent unintended excision of the structure. Accordingly, it is possible to automatically set an appropriate excision region. Further, doctors and radiographers can easily set a region of an organ that should be actually excised.

In the surgery-assistance apparatus of the present invention, when the partial region extraction means calculates, as the partial region, a region belonging to the inside of the elliptic parabolic surface or the circular conic surface that circumscribes the set enclosing body, and the volume or the surface area of the region being smallest, if the partial region is determined as the excision region, it is possible to determine an excision region having a smaller volume or boundary surface to be excised. Accordingly, doctors and radiographers can easily set a region of an organ that should be actually excised.

Further, in the surgery-assistance apparatus of the present invention, when the abnormal region extraction means can extract plural abnormal regions, and the enclosing body setting means sets a smallest enclosing body that encloses all of at least two of the plural extracted abnormal regions that are located within a predetermined distance from each other when the at least two of the plural extracted abnormal regions are located within the predetermined distance, the partial region is calculated in such a manner that the boundary surface to be excised is minimized. Therefore, when the partial region is determined as the excision region, the excision region that has a smaller boundary surface to be excised is determined, compared with the case of determining the excision region for each of the abnormal regions. Accordingly, it is possible to easily set a region of an organ that should be actually excised in such a manner that the set region is appropriate to reduce a burden of a surgery on a patient and to reduce the operation time of the surgery.

When the surgery-assistance apparatus of the present invention further includes an alert means that issues an alert when a structure is present in the extracted partial region, it is possible to notify doctors that a structure will be unintentionally excised by the determined excision region. Therefore, it becomes possible to easily judge whether the excision region is appropriately set. Hence, the surgery-assistance apparatus can assist doctors in determining an appropriate excision region.

Further, in the surgery-assistance apparatus of the present invention, when the medical image obtainment means further obtains a functional image representing a function level at each position of the organ, and the dominance region extraction means determines the dominance region by using a distance weighted based on the function level at each position on a shortest path between each part of the organ and the part of the structure extending from a predetermined position in the extracted region of the structure toward the part of the organ including the abnormal region in the medical image, it is possible to appropriately set the dominance region based on the function level of the organ. Therefore, when the dominance region is determined as the excision region, it is possible to automatically set a more appropriate excision region. Hence, doctors and radiographers can easily set a region of the organ that should be actually excised.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

DESCRIPTION OF THE PREFERRED EMBODIMENTS

Hereinafter, a surgery-assistance apparatus, program and method according to embodiments of the present invention will be described in detail with reference to drawings.

In the following embodiments, a surgery-assistance apparatus 1 is realized by installing, in a computer, a surgery-assistance program according to each embodiment of the present invention. The computer may be a workstation or a personal computer that is directly operated by a doctor who diagnoses a patient. Alternatively, the computer may be a server computer connected, through a network, to the workstation, the personal computer or the like. A surgery-assistance program is stored in a recording medium, such as a DVD and a CD-ROM, and distributed. Further, the surgery-assistance program is installed in a computer from the recording medium. Alternatively, the surgery-assistance program may be stored in a storage device of a server computer connected to a network, or stored in a network storage accessibly from the outside. The surgery-assistance program is downloaded, based on a request for downloading, in a computer used by the doctor, and installed in the computer.

Figure 1:
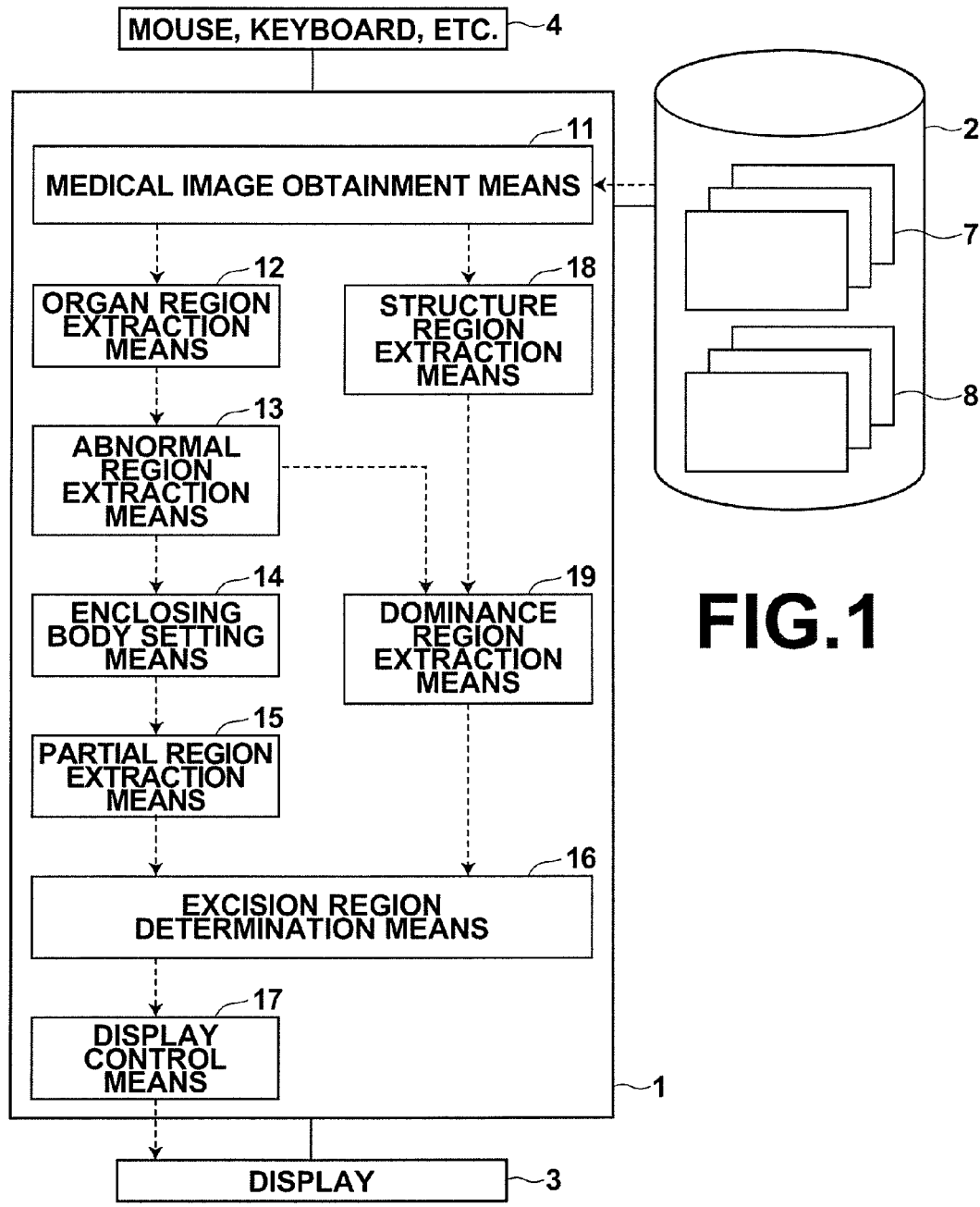
FIG. 1 is a schematic diagram illustrating the configuration of a surgery-assistance apparatus according to an embodiment of the present invention.

FIG. 1 is a schematic diagram illustrating the configuration of the surgery-assistance apparatus 1, which is realized by installing a surgery-assistance program in a workstation. As FIG. 1 illustrates, the surgery-assistance apparatus 1 is configured as a standard workstation that includes a CPU (not illustrated) and a memory (not illustrated), and a storage 2 is provided. Further, a display (display device) 3, and an input device 4, such as a mouse, are connected to the surgery-assistance apparatus 1.

The storage 2 stores, as a three-dimensional anatomical image 7, volume data reconstructed from slice data output from a CT (Computed Tomography) apparatus or an MRI (Magnetic Resonance Imaging) apparatus, volume data output from an MS (Multi Slice) CT apparatus or a cone-beam CT apparatus, or the like. The volume data are obtained by performing plural times of imaging on a patient to be examined (a region to be examined or the like) at predetermined time intervals. The storage 2 stores plural sets of time-series volume data for each patient or a region of each patient, and for each modality.

Further, the storage 2 stores, as a three-dimensional functional image 8, a SPECT (Single Photon Emission Computed Tomography) image output from a SPECT apparatus, a functional image 8 generated by analyzing volume data output from a MSCT (Multi-Slice Computed Tomography) apparatus, or the like.

The memory stores the surgery-assistance program and data (processing parameter or the like) to which the surgery-assistance program refers. The surgery-assistance program regulates, as processing executed by the CPU, medical image obtainment processing, organ region extraction processing, abnormal region extraction processing, enclosing body setting processing, partial region extraction processing, structure region extraction processing, dominance region extraction processing, excision region determination processing, and display control processing. When the CPU executes these kinds of processing based on the program, the general-purpose workstation functions as a medical image obtainment means 11, an organ region extraction means 12, an abnormal region extraction means 13, an enclosing body setting means 14, a partial region extraction means 15, a structure region extraction means 18, a dominance region extraction means 19, an excision region determination means 16, and a display control means 17.

FIG. 1 is a functional block diagram of the surgery-assistance apparatus 1. Each functional block will be described.

The medical image obtainment means 11 obtains a medical image representing an organ including a diseased part to be excised. In the present embodiment, an X-ray CT image of the liver of a patient to be examined is used as a processing target image. When plural kinds of examination (for example, CT examination and SPECT examination) are performed on the patient, and as a result, both of the three-dimensional anatomical image 7 and the three-dimensional functional image 8 are stored in the storage 2, the two kinds of image are loaded in the memory. When only the three-dimensional anatomical image 7 is stored, only the three-dimensional anatomical image 7 is loaded.

The organ region extraction means 12 extracts an organ region from the obtained medical image. In the present embodiment, the organ region extraction means 12 calculates a feature value representing the likelihood of the contour of a liver with respect to each value of voxel data constituting the three-dimensional anatomical image 7. Further, the organ region extraction means 12 evaluates, based on an evaluation function that has been obtained in advance by machine learning, the calculated feature values. In this manner, the organ region extraction means 12 judges whether voxel data represent the contour of the liver. This judgment is repeated to extract voxel data representing the contour of the whole liver. In this embodiment, an AdaBoost algorithm is used to obtain the evaluation function. A liver region 5 may be extracted by using various known methods as long as the organ can be extracted. Other machine learning methods and statistical analysis methods, for example, such as a linear discriminant method, a neural network and a support vector machine, may be used.

The abnormal region extraction means 13 extracts an abnormal region of the organ, such as an abnormal shadow, from the region of the organ included in the medical image. The abnormal region extraction means 13 may use various known methods as long as an abnormal region of the organ, such as an abnormal shadow, can be extracted from the region of the organ included in the medical image. In the present embodiment, a three-dimensional anatomical image is displayed on a display, and specification of a region is received by an operation of a mouse or the like by a user. Further, the specified region is extracted as an abnormal region 51.

In detection of an abnormal region, various known techniques are adoptable as long as an abnormality enclosed in an organ (an abnormal region included in the organ) are detectable. Specifically, techniques disclosed, for example, in U.S Patent Application Publication No. 20030095692, and in Japanese Unexamined Patent Publication No. 2003-271924 are adoptable. Further, a technique for detecting a lung cancer disclosed in K. Kubota et al., "Evaluation of Computer-Aided Diagnosis system for Lung Cancer based on Helical CT images", the Institute of Electronics, Information and Communication Engineers (IEICE), IEICE Technical Report, pp. 41-46, 2001 is applicable. Further, consolidation disclosed in S. Kido et al., "Intelligent CAD for diffuse lung diseases", Grant-in-Aid for Scientific Research, granted by the Ministry of Education, Culture, Sports, Science and Technology (MEXT), Study in Specific Field "Intellectual Diagnosis Aid of Multi-Dimensional Medical Image", Proceedings of 4th Symposium, pp. 45-54, 2007 is applicable. Further, Ground-Glass Opacity (GGO) and Crazy-Paving are applicable. Further, detection techniques of diffuse lung disease, such as honeycomb-shaped shadow, pulmonary emphysema shadow and particle-shaped shadow, are applicable. Further, a technique for detecting a liver cancer disclosed in Y. Wakida et al., "Liver Cancer Detection based on a Temporal Density Feature from Abdominal Dynamic X-ray CT Images", Journal of Computer Aided Diagnosis of Medical Images, Vol. 10, No. 1, pp. 1-10, 2007 is applicable. Further, a technique for detecting hepatocellular carcinoma, hepatic cyst, hepatic hemangioma, and bleeding in a liver region disclosed in H. Fujita et al., "Intelligent Computer-aided Diagnosis Based on Normal Structure Recognition of Human Body", Grant-in-Aid for Scientific Research, granted by the Ministry of Education, Culture, Sports, Science and Technology (MEXT), Study in Specific Field "Intellectual Diagnosis Aid of Multi-Dimensional Medical Image", Proceedings of 4th Symposium, pp. 55-60, 2007 is applicable.

Figure 2:
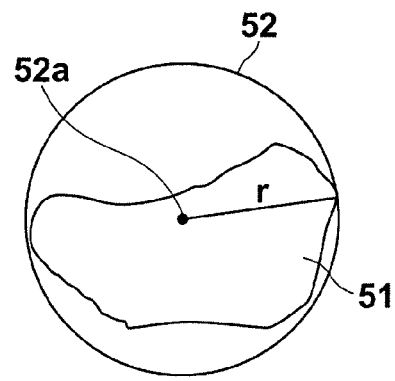
FIG. 2 is a schematic diagram illustrating an enclosing body setting process in an embodiment of the present invention.

The enclosing body setting means 14 sets a smallest enclosing body 52 that encloses the abnormal region 51. FIG. 2 is a schematic diagram illustrating a process of setting the enclosing body 52 in the present embodiment. As illustrated in FIG. 2, in the present embodiment, a circumscribed sphere that encloses the abnormal region 51, and that has a smallest radius, is calculated by using a known method, and the sphere obtained by calculation is set as the enclosing body 52. Further, the coordinate of the center 52a of the set enclosing body 52 and radius r of the sphere are stored in a memory.

Figure 3:
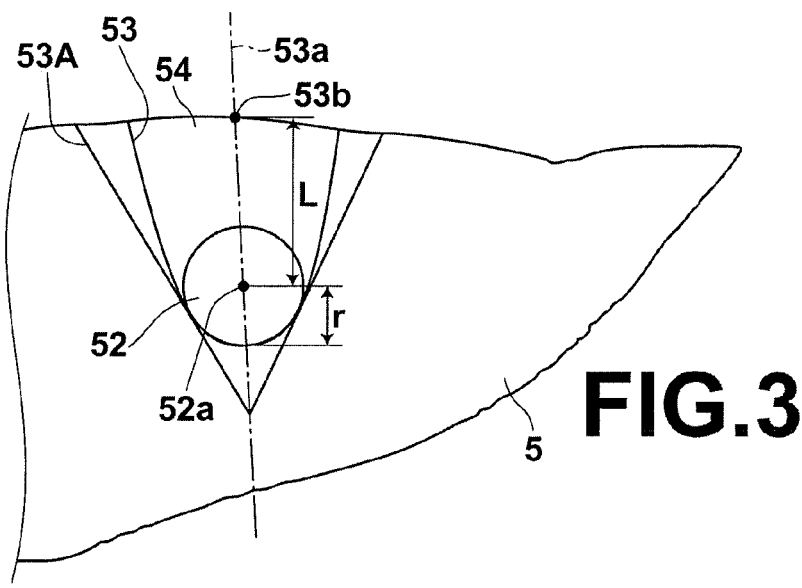
FIG. 3 is a diagram for explaining a partial region extraction process in an embodiment of the present invention.

In the present embodiment, the partial region extraction means 15 extracts, as a partial region 54, a part of an organ, and the part belonging to the inside of a rotation paraboloid that circumscribes the set enclosing body 52. FIG. 3 is a schematic diagram illustrating processing for extracting the partial region 54 in the present embodiment. As illustrated in FIG. 3, in the present embodiment, a rotation paraboloid 53 that encloses the enclosing body 52, which is a sphere, is obtained by calculation. Further, a part of the region, and the part belonging to the inside of the rotation paraboloid 53 is extracted as the partial region 54.

The partial region extraction means 15 may obtain plural rotation paraboloids 53, each of which encloses a sphere that is the enclosing body 52. Further, the partial region extraction means 15 may calculate, as the partial region 54, a region belonging to the inside of the rotation paraboloid that circumscribes the set enclosing body 52, and the region having a smallest volume or surface area. Here, plural rotation paraboloids 53, each of which circumscribes the enclosing body 52, are calculated by changing the value of constant a in the following formula (1). Further, the volume of apart of the organ, and the part belonging to the inside of each of the rotation paraboloids 53, is calculated for the respective rotation paraboloids 53. Further, a rotation paraboloid 53 that has a smallest volume region belonging to the inside thereof among the plural rotation paraboloids 53 is determined as the partial region 54. Further, data specifying the rotation paraboloid 53 corresponding to the determined partial region 54 are stored in the memory. The data specifying the rotation paraboloid 53 are an axis 53a of the rotation paraboloid 53, a point 53b of intersection between the rotation paraboloid 53 and the surface of the organ, and the point 53b being located in the inside of the rotation paraboloid 53, or the like. Here, a rotation paraboloid that circumscribes a sphere is represented by the following formula (1). In the formula (1), the center 52a of a sphere that is the enclosing body 52 is an origin of the rotation paraboloid, and the radius of the sphere, which is the enclosing body 52, is r, and a direction from the center 52a of the enclosing body 52, which is the origin, toward the surface of the organ is a positive direction of y axis.

[Formula 1]

$$z = a(x^2 + y^2) - r \qquad (1)$$

It is desirable that users can input or correct the axis 53a of the rotation paraboloid by an manual operation.

The structure region extraction means 18 extracts, from obtained medical image V, a region 6 of a structure dominating the organ. The structure region extraction means 18 performs, on the liver region 5 extracted from the medical image V, blood vessel region extraction processing and tree structure detection processing. First, eigenvalues of 3×3 Hessian matrix are calculated for each local region in the liver region 5 to probe the local regions for a linear structure. One of the three eigenvalues of the Hessian matrix is close to zero, and the other two eigenvalues are relatively large values in a region including a linear structure. An eigenvector corresponding to the eigenvalue close to zero represents the main axial direction of the linear structure. The structure region extraction means 18 uses this relationship, and judges the likelihood of a linear structure, based on the eigenvalues of the Hessian matrix, for each local region. Further, when a linear structure is identified in a local region, a center point in the local region is detected as a candidate point.

Further, candidate points detected by probing are connected to each other based on a predetermined algorithm. Accordingly, tree structure 6A composed of the candidate points and blood vessel branches (edges) connecting the candidate points is constructed. Coordinate information about the plural candidate points that have been detected, and vector information representing the directions of the blood vessel branches are stored in the memory together with the identifiers of the candidate points and the blood vessel branches. Then, the contour of a blood vessel (the outer wall of a blood vessel) is identified for each of the detected candidate points in a cross section of the blood vessel perpendicular to the path of the blood vessel. The contour of the blood vessel is identified based on the values (CT values) of voxels in the vicinity of each of the detected candidate points. The shape is identified by using a known segmentation method, typified by a Graph-Cuts method. Through the process as described above, information that is necessary to identify the extracted blood vessel region is generated, and stored in the memory.

The dominance region extraction means 19 extracts, as a dominance region 56, a part of an organ, and the part including the abnormal region 51 and being dominated by a part of a structure extending from a predetermined position in a region of the extracted structure toward the part of the organ including the abnormal region 51. Hereinafter, in the specification of the present application, a part of a structure extending from a predetermined position in a region of the structure toward a part of an organ including a diseased part will be referred to as a structure part (a part of a structure) in some cases. Further, a dominance region of the organ that is dominated by the structure part will be referred to as a "dominance region dominated by the structure part".

Figure 4:
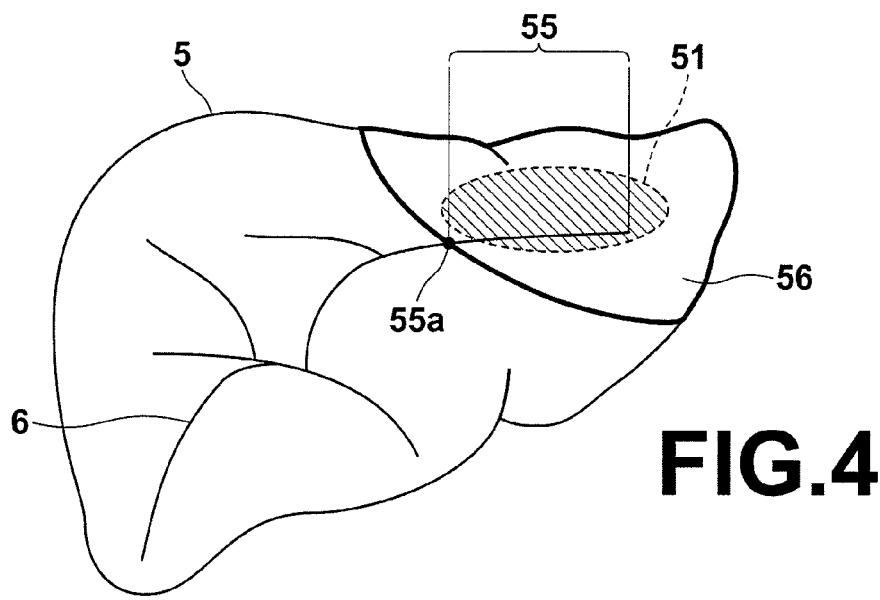
FIG. 4 is a diagram for explaining a dominance region extraction process in an embodiment of the present invention.

FIG. 4 is a schematic diagram illustrating a process of extracting a dominance region 56 in the present embodiment. As illustrated in FIG. 4, first, the dominance region extraction means 19 extracts, based on the extracted region 5 of the organ and the extracted region 6 of the structure, a dominance region dominated by the structure. In the present embodiment, a blood vessel in the liver region is extracted by using a method disclosed in Japanese Unexamined Patent Publication No. 2003-033349. Further, blood vessels that dominate regions in the liver region (liver parenchyma or the like) other than the blood vessels are identified by using a Voronoi diagram. Various other known methods may be used as long as a dominance region is extracted.

Further, the dominance region extraction means 19 sets a part of the structure that dominates a part of the organ, the part including the diseased part to be removed. A region 55 of the part of the structure may be set by using various known methods. In the present embodiment, a structure is displayed on a display, and an input specifying a position on a blood vessel by a manual operation of a user at an input device, such as a mouse, is accepted. Further, a region extending from a specified position 55a toward the organ including the diseased part is set as the region 55 of the part of the structure. The region 55 of the part of the structure may be set automatically by using a known technique, such as the technique disclosed in Japanese Unexamined Patent Publication No. 2001-283191.

Further, the dominance region extraction means 19 determines a dominance region 56 dominated by the region 55 of the part of the structure based on the dominance region dominated by the set part of the structure.

Figure 5:
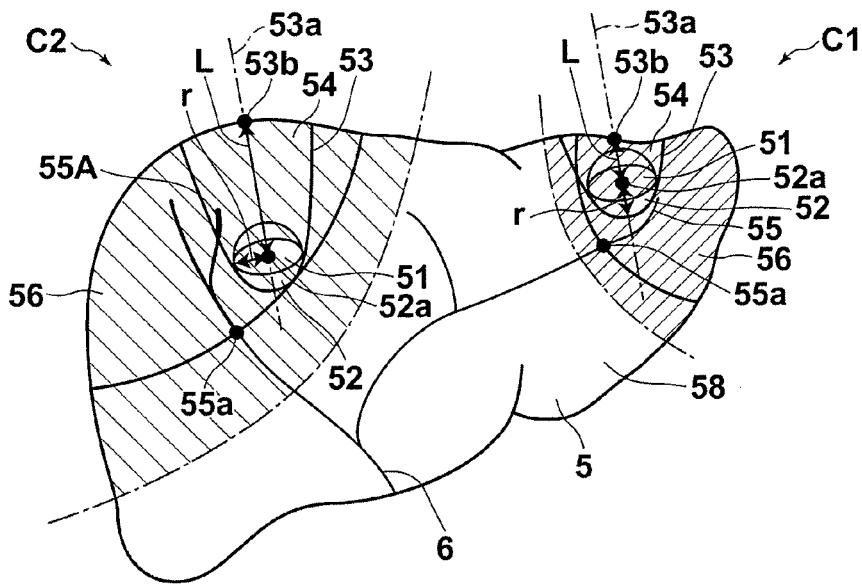
FIG. 5 is a diagram for explaining an excision region determination process in an embodiment of the present invention.

The excision region determination means 16 determines the excision region based on a excision region determination condition in which the excision region is determined in such a manner to give a priority to the partial region when a distance from a predetermined point present in the abnormal region 51 to a surface of the region of the organ is less than or equal to a predetermined threshold value, and the excision region is determined in such a manner to give a priority to the dominance region when the distance from the predetermined point (such as a center) present in the abnormal region to the surface of the region of the organ is greater than the predetermined threshold value. FIG. 5 is a schematic diagram illustrating a process of determining an excision region in the present embodiment. In FIG. 5, sign C1 indicates a case in which distance L from the center of the abnormal region 51 to the surface of the region of the organ is less than or equal to a predetermined threshold value. In such a case, as illustrated in C1 of FIG. 5, the excision region determination means 16 determines, based on the excision region determination condition, the partial region 54 as the excision region. Meanwhile, sign C2 indicates a case in which distance L from the center of the abnormal region 51 to the surface of the region of the organ is greater than the predetermined threshold value. In such a case, as illustrated in C2 of FIG. 5, the excision region determination means 16 determines, based on the excision region determination condition, the dominance region 56 as the excision region.

Here, in calculation of distance L, a center 52*a* of the enclosing body 52 is used as a predetermined point present in the abnormal region 51, and a distance between the center 52*a* of the enclosing body 52 and an intersection 53*b* of the axis of the rotation paraboloid 53 and the surface of the organ is used as distance L. Any length may be set as the distance L as long as the distance represents a depth of the abnormal region to be removed, and the depth being measured from an excision-side surface of the organ. Further, the predetermined threshold value may be appropriately set by a doctor or the like. The predetermined point present in the abnormal region 51 may be any point as long as the point is located at a representative position in the abnormal region. An arbitrary point may be set as the predetermined point as long as the point is present in the abnormal region 51. For example, the center of the abnormal region 51 may be used as the predetermined point present in the abnormal region 51. Further, the "distance between the predetermined point present in the abnormal region 51 and the surface of the organ" may be obtained by adding distance L between the center 52*a* of the enclosing body 52 and the intersection 53*b* of the axis of the rotation paraboloid 53 and the surface of the organ and radius r of the enclosing body 52 together. In such a case, the distance from the predetermined point present in the abnormal region 51 to the surface of the organ represents an approximate depth of a region to be removed from the region of the organ when the abnormal region is removed. Therefore, it is possible to appropriately extract a partial region based on the depth of the region to be removed.

The display control means 17 displays the set excision region in an identifiable manner on a display 3. In the present embodiment, a predetermined transparency degree is set so that the excision region is displayed as a semi-transparent or translucent region. Further, a non-target region excluding a margin region is displayed as an opaque color region. Further, each of the abnormal region 51, the enclosing body 52, the partial region 54, and the dominance region 56, which have been set or extracted by the aforementioned means, is displayed on the display 3 in an identifiable manner, for example, by using different colors, or the like.

Figure 6:
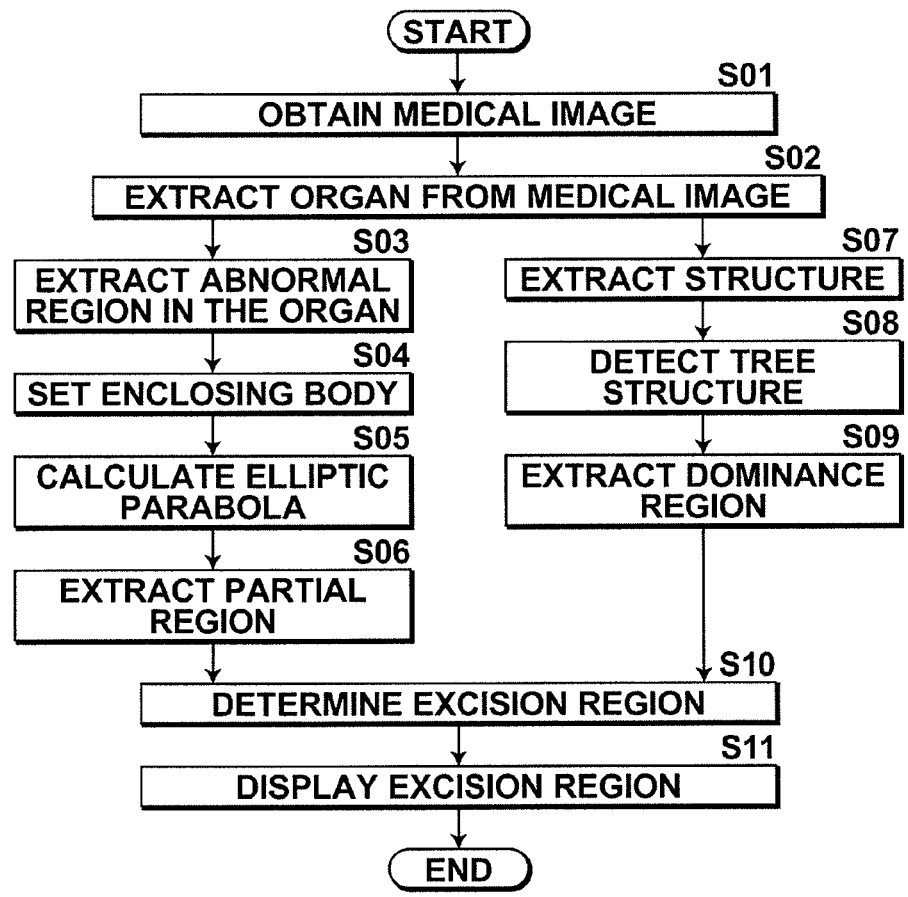
FIG. 6 is a flow chart of processing performed by a surgery-assistance apparatus according to an embodiment of the present invention.

FIG. 6 is a flow chart for explaining the flow of surgery-assistance processing in the present embodiment. The surgery-assistance processing according to the present embodiment will be described with reference to FIG. 6.

First, when the medical image obtainment means 11 detects selection of a surgery-assistance function according to the present embodiment in a selection menu, the medical image obtainment means 11 displays a list of ID's of patients to be examined (or regions of the patients). When the surgery-assistance apparatus 1 detects a selection operation by a user, the surgery-assistance apparatus 1 loads an image file related to the selected patient or region to be examined into a memory (step S01).

When medical image V, which is a three-dimensional anatomical image, is loaded into the memory, the organ region extraction means 12 extracts a liver region 5 from the medical image V (step S02). Further, the display control means 17 displays the extracted liver region 5 on the display 3.

Next, the abnormal region extraction means 13 extracts the abnormal region 51 from the liver region 5 (step S03). In the present embodiment, a user performs an operation for selecting an abnormal region input mode in a selection menu, and specifies the abnormal region 51 included in the liver region 5 in a displayed image by using the input unit 4. The abnormal region extraction means 13 detects such an operation of the input unit 4 by the user, and extracts the detected region as the abnormal region 51.

Then, the enclosing body setting means 14 sets a smallest enclosing body that encloses the abnormal region (step S04). In the present embodiment, as illustrated in FIG. 3, a sphere 52 that encloses the abnormal region 61, and that has a smallest radius is set. Further, the center 52*a* and radius r of the sphere 52 are stored in the memory.

Further, the partial region extraction means 15 calculates, based on the stored center 52*a* and radius r of the sphere, plural rotation paraboloids 53 that circumscribe the set enclosing body 52 by using the formula (1) (step S05). Further, the partial region extraction means 15 calculates a part of the liver present in an elliptic parabolic surface for each of the plural rotation paraboloids, and extracts, as the partial region 54, a part of the liver having a smallest volume among the parts of the liver (step S06).

Meanwhile, the structure region extraction means 18 extracts, from the obtained medical image V, a region 6 of the structure dominating the organ (step S07). In the present embodiment, a blood vessel region 6 that dominates the liver is extracted. Further, the dominance region extraction means 19 constructs a tree structure composed of blood vessel branches in the extracted blood vessel region 6 (step S08). The surgery-assistance apparatus 1 may perform the organ region extraction processing and the partial region extraction processing on the medical image V in steps S02 through S05 and the dominance region extraction processing in steps S07 through S09 in parallel.

Next, the dominance region extraction means 19 extracts, based on the extracted liver region 5 and the extracted blood vessel region 6, a dominance region dominated by each of blood vessel branches constituting the blood vessel region 6 (step S09).

Further, the excision region determination means 16 determines an excision region based on excision region determination conditions that determine the excision region by weighting the partial region 54 and the dominance region 56 in such a manner to give a priority to the partial region 54 when distance L from a center of the abnormal region 51 to a surface of the organ region is less than or equal to a predetermined threshold value, and to give a priority to the dominance region 56 when the distance L from the center of the abnormal region 51 to the surface of the organ region is greater than the predetermined threshold value (step S10).

After then, the excision region determination means 16 stores the determined excision region in the memory and the storage 2, and outputs the determined excision region, for example, to a display device (monitor display), a printer device (printout), a data recording device (recording on a medium), or the like.

Further, as illustrated in FIG. 5, the display control means 17 displays the excision region on the display 3 in an identifiable manner (step S11). In example C1 illustrated in FIG. 5, the partial region 54 is determined as the excision region. Therefore, the partial region 54 is displayed in an identifiable manner. Meanwhile, in example C2 illustrated in FIG. 5, the dominance region 56 is determined as the excision region. Therefore, the dominance region 56 is displayed in an identifiable manner. In FIG. 5, different colors are assigned to the excision region, the enclosing body 52, the partial region 54, the dominance region 56 and an non-excision region in the liver 5, respectively. Further, the excision region, the enclosing body 52, the partial region 54, and the dominance region 56 are displayed semi-transparently, and the non-excision region is displayed opaquely.

According to the aforementioned embodiment, it is possible to determine, based on a predetermined excision region determination condition, the more appropriate one of the partial region and the dominance region, as the excision region. Therefore, doctors and radiographers can easily set a region of an organ that should be actually removed.

Further, the excision region determination condition according to the present embodiment determines, based on a distance from a predetermined point present in an abnormal region to a surface region, the more appropriate one of the partial region and the dominance region, as the excision region. Here, when the partial region is removed, if the depth of an organ to be removed from the surface of the organ is deep, the surface area of excision tends to large. Further, an influence of dominance by a structure, such as plural blood vessels, on the part of the organ included in the partial region tends to great. In contrast, when a diseased part is a surface of an organ or the like, the number of structures, such as a blood vessel, that dominate the organ is relatively small, and the structures are located relatively away from the diseased part. In such a case, the influence of the structure dominating the organ is supposed to be relatively small. Therefore, it is desirable to determine the dominance region as the excision region when a depth of an organ to be removed, the depth being a depth from a surface of the organ, is larger than a predetermined value. However, when a depth of an organ to be removed, the depth being a depth from a surface of the organ, is less than or equal to the predetermined value, it is desirable to determine the partial region as the excision region, because the influence of the structure dominating the organ is relatively small. Therefore, according to the present embodiment, it is possible to determine, based on the distance from a predetermined point present in the abnormal region to the surface region, the more appropriate one of the partial region and the dominance region, as the excision region. Hence, doctors and radiographers can easily set a region of an organ that should be actually removed based on a depth of an organ to be removed, and the depth from the surface of the organ (from the excision-side surface of the organ).

Further, in the present embodiment, the partial region extraction means 15 calculates, as the partial region, a region belonging to the inside of the elliptic parabolic surface or the circular conic surface that circumscribes the set enclosing body, and the volume or the boundary surface to be excised being smallest. Therefore, when the partial region is determined as the excision region, it is possible to determine, as the excision region, a region having a smaller volume or a smaller boundary surface to be excised. Accordingly, doctors and radiographers can easily set a region of an organ that should be actually removed. Further, the same advantageous effects are achievable when plural regions, each belonging to the inside of the elliptic parabolic surface or the circular conic surface that circumscribes the set enclosing body, are calculated, and one of the plural regions, in which the surface of a boundary between the region belonging to the inside of the elliptic parabolic surface or the circular conic surface that circumscribes the set enclosing body and the remaining region of the organ is smallest, is calculated as the partial region.

Further, it is one of characteristic features of the present invention to extract, only based on the size and the position of the abnormal region, a region belonging to the inside of the elliptic parabolic surface or the circular conic surface that circumscribes an enclosing body that encloses an abnormal region. Further, plural regions, each belonging to the inside of the elliptic parabolic surface or the circular conic surface, are calculated, and one of the plural regions, in which the surface area or the volume is smallest, is extracted as a partial region to be removed. Accordingly, it is possible to extract, only based on the size and the position of the abnormal region, a region that has a smallest surface area or volume, as the partial region to be removed. As described above, the enclosing body enclosing the abnormal region is set only based on the size and the position of the abnormal region, and a region belonging to the inside of the elliptic parabolic surface or the circular conic surface that circumscribes the enclosing body is extracted as the partial region. Therefore, there is a high possibility that the surface area or the volume of the partial region to be removed is smaller than a case, as in Patent Document 1, in which a position abutting a blood vessel is regarded as a boundary of a partial region. Further, it is desirable that the partial region extraction condition weights in such a manner that a lower priority is given to a region including a structure, such as a blood vessel, among regions, each belonging to the inside of the elliptic parabolic surface or the circular conic surface, so that the region is not extracted as the partial region. In such a case, it is possible to extract, as the partial region, a region that does not include a structure, such as a blood vessel, as in Patent Document 1. Further, there is a high possibility that the surface area or the volume of the partial region to be removed is smaller than a case, as in Patent Document 1, in which a position abutting a blood vessel is regarded as a boundary of the partial region.

According to the present embodiment, a display control means 17 is further provided. The display control means 17 displays the determined excision region on a display device in an identifiable manner. Therefore, it is possible to easily recognize a region to be removed. The set excision region is presented to a doctor, and the doctor can easily judge whether the set excision region is appropriate. Accordingly, it is possible to assist the doctor or the like in determining an appropriate excision region.

Next, modified examples of the present invention will be described. Each of the following modified examples may be further modified in various manners without departing from the gist of the present invention. Further, the modified examples may be combined with each other in an arbitrary manner.

The excision region determination condition, as a modified example of the present embodiment, may be set in an arbitrary manner as long as it is possible to appropriately determine the excision region. Further, arbitrary plural conditions may be set in combination. Here, it is desirable that the excision region is appropriately determined in such a manner that a burden of a surgery on a patient and an operation time of the surgery are reduced. For example, it is desirable that the area of a boundary at which the excision region is removed is minimized. Further, it is desirable that the volume of the excision region is minimized so as to maximize a healthy normal part of the patient's organ that remains after the surgery. Further, it is desirable to determine the excision region, appropriately evaluating an influence of dominance by a structure, such as a blood vessel, that dominates the organ. Therefore, for example, the excision region determination condition may determine the excision region by weighting in such a manner to give a priority to one of the partial region and the dominance region that has the smaller volume or surface area. Further, when the size of the abnormal region 51 or the enclosing body 52 is large, as in the case in which the volume of the abnormal region 51 is large or the radius of the enclosing body 52 is large, it is expected that the depth of a region to be excited from the surface of the organ tends to be deep. Therefore, the excision region determination condition may determine the excision region by weighting in such a manner to give a priority to the dominance region when the size of the abnormal region 51 or the enclosing body 52 is large. In such a case, it is possible to determine, as the excision region, one of the partial region and the dominance region that has the smaller volume or boundary surface of the region to be removed. Hence, it is possible to determine, as the excision region, a region having a smaller boundary surface at which the region is removed. Accordingly, it is possible to easily set a region of an organ to be actually removed in an appropriate manner to reduce a burden of a surgery on a patient and an operation time of the surgery.

Further, the excision region determination condition in a modified example of the present invention may determine the excision region by weighting in such a manner to give a priority to a dominance region when a partial region encloses a structure, as indicated by C2 in FIG. 5. In such a case, it is possible to determine the excision region in such a manner to give a priority to the dominance region dominated by a structure than the partial region including the structure. Therefore, it is possible to prevent unintended removal of the structure. Accordingly, it is possible to automatically set an appropriate excision region. Further, a doctor or a radiographer can easily set a region of an organ to be actually removed.

Further, when a part 55A of a structure is present in the extracted partial region 54, as indicated by C2 in FIG. 5, a partial region 54 may be extracted again after the inclination of the axis 53a of the elliptic parabolic surface or the circular conic surface is changed. Consequently, it is possible to prevent unintended removal of the structure.

Figure 7:
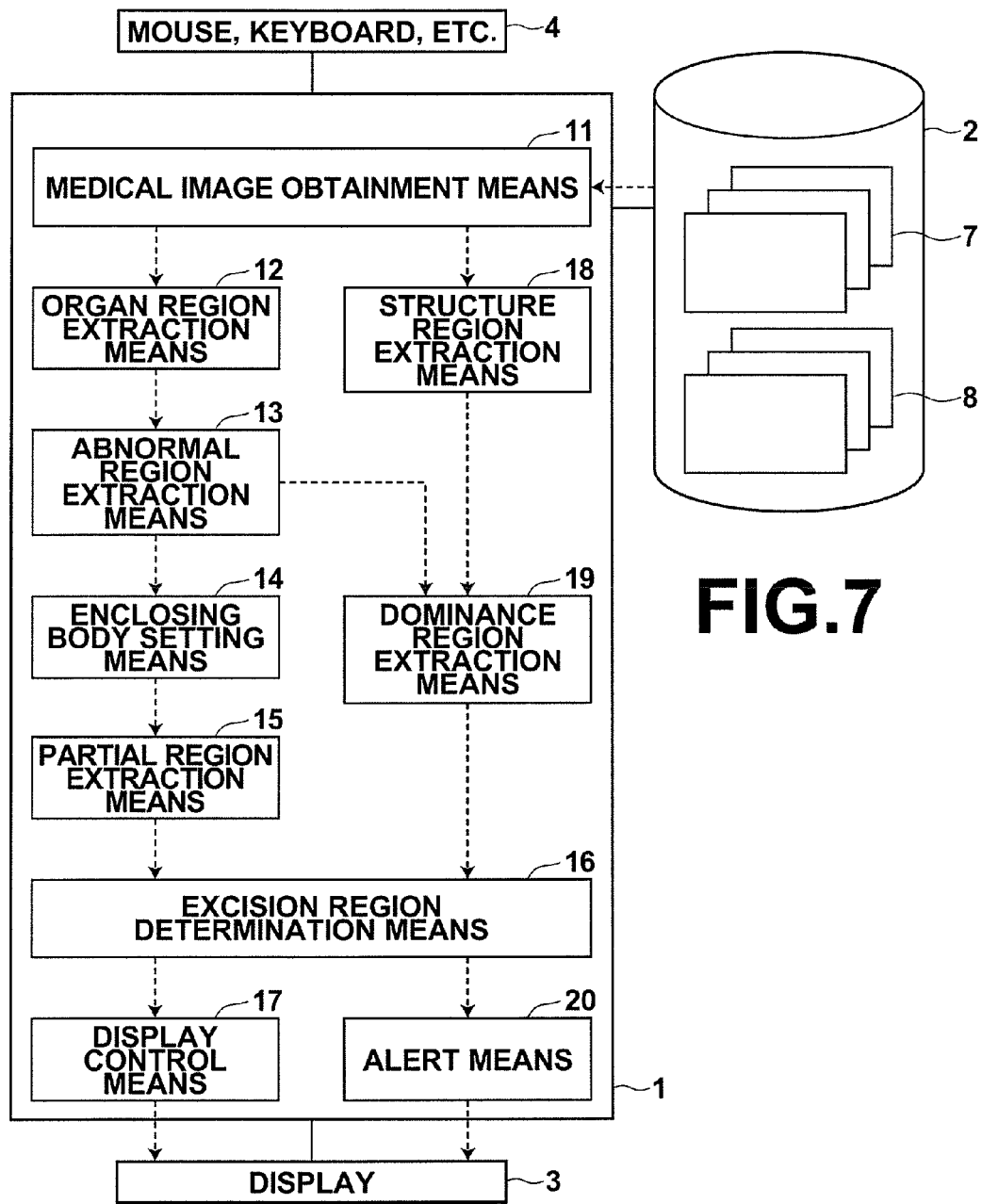
FIG. 7 is a schematic diagram illustrating the configuration of a surgery-assistance apparatus according to a modified example of an embodiment of the present invention.

FIG. 7 is a schematic diagram illustrating a modified example of the surgery-assistance apparatus 1 of the present embodiment. It is desirable that the surgery-assistance apparatus 1 further includes an alert means 20 that issues an alert when the part 55A of the structure is present in the extracted partial region, as indicated by C2 in FIG. 5. The alert means 20 may issue an alert by making the display control means 17 display an alert message on a display screen. The method for outputting the alert to the outside of the apparatus is not limited to such a method. An alert sound or voice may be output. Alternatively, an alert message may be displayed in a superimposed manner, and an alert sound or the like may be output at the same time when the alert message is displayed. Further, the alert means 20 may instruct the display control means 17 to blink an index of a tree structure representing the part 55A of the structure, and to change the color of the index of the tree structure representing the part 55A of the structure to a different color so that the part 55A is identifiable.

In the above case, for example, the enclosing body setting means 14 detects a part 55A of the structure included in the determined partial region 54. Further, the enclosing body setting means 14 extracts, based on the partial region 54 and the blood vessel region 6 that have been extracted by the aforementioned partial region extraction processing and structure region extraction processing, the part 55A of the blood vessel region 6 included in the partial region 54. For example, when the partial region 54 includes the part 55A of the blood vessel region, as in the partial region 54 indicated by C2 in FIG. 5, the display control means 17 displays an index representing this part of the blood vessel region in an identifiable manner on the display 3. Specifically, the color of the part 55A of the blood vessel region belonging to the partial region 54 is changed to a different color so that the part 55A is identifiable.

In the above case, a doctor is notified that the determined excision region will cause unintended removal of the structure region 6. Therefore, the doctor can easily judge whether the excision region is appropriately set. Hence, it is possible to assist the doctor in determining an appropriate excision region.

Figure 8:
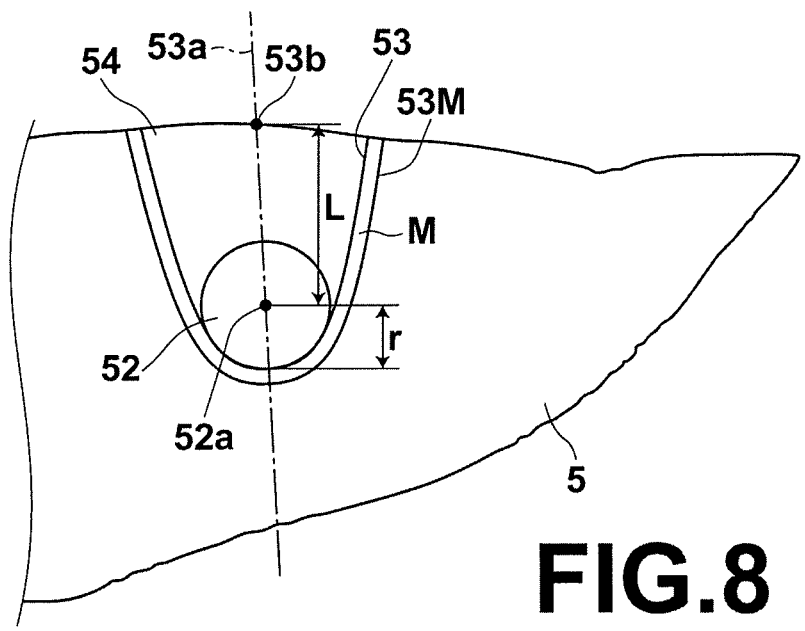
FIG. 8 is a diagram for explaining a modified example of a partial region extraction process in an embodiment of the present invention.

As a modified example of partial region extraction processing in the present embodiment, the partial region extraction means 15 may extract the partial region 54 by adding predetermined margin region M to the elliptic parabolic surface or the circular conic surface that circumscribes the enclosing body 52, if necessary. FIG. 8 is a diagram for explaining the modified example of partial region extraction processing in the present embodiment. As illustrated in FIG. 8, for example, a part of an organ, and the part belonging to an elliptic parabolic surface 53M including margin region M, which has been added to a circular conic surface or elliptic parabolic surface 53 that circumscribes the enclosing body, may be used as the partial region 54. The term "margin region" means a small additional region that is added, for a safety reason, to a region desired to be removed when the region desired to be removed is actually removed. The margin region differs depending on the kind of a tumor to be removed, and a doctor who is an operator of a surgery.

Further, the volumes of the displayed excision region, the abnormal region 51, the enclosing body 52, the partial region 54, the dominance region 56, and the non-excision region, which is a remaining part of the liver after excision may be displayed in combination in an arbitrary manner. Further, when the non-excision region is ⅓ or less of the entire liver, an alert may be issued. Generally, it is desirable that the remaining part of the liver after excision is at least ⅓ of the entire liver. Therefore, it is possible to guide a user to set the volume of the excision region in an appropriate range. Accordingly, it is possible to assist the user in appropriately setting the excision region.

Figure 9:
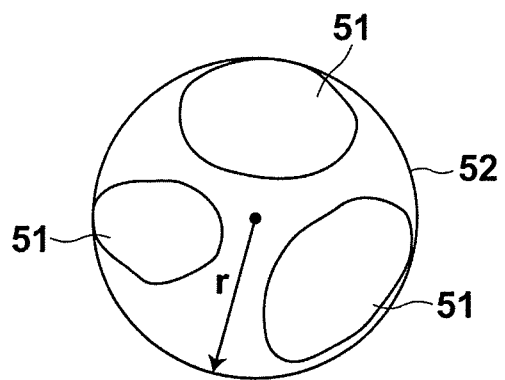
FIG. 9 is a diagram for explaining a modified example of an enclosing body setting process in an embodiment of the present invention.

FIG. 9 is a diagram illustrating a modified example of enclosing body setting processing in the present embodiment. As illustrated in FIG. 9, when the abnormal region extraction means 13 can extract plural abnormal regions 51, and at least two of the extracted plural abnormal regions 51 are located within a predetermined distance from each other, the enclosing body setting means 14 may set a single smallest enclosing body that encloses all of the at least two of the extracted plural abnormal regions 51. As illustrated in FIG. 9, a smallest sphere enclosing all of the plural abnormal regions located within a predetermined distance may be calculated. If the radius of the calculated smallest sphere is less than or equal to a predetermined value, the calculated smallest sphere may be obtained as the smallest enclosing body.

As described above, when at least two of the extracted plural abnormal regions 51 are located within a predetermined distance from each other, the enclosing body setting means 14 may set a single smallest enclosing body that encloses all of the at least two of the extracted plural abnormal regions 51 located within the predetermined distance. In such a case, the partial region is calculated in such a manner that the boundary surface of a region to be removed is minimized, compared with the case of determining an excision region for each of the abnormal regions 51. Therefore, when the partial region is determined as the excision region, it is possible to determine the excision region having a smaller boundary surface of the region to be removed. Accordingly, it is possible to easily set a region of an organ to be actually removed in such a manner that the region is appropriate to ease a burden of a surgery on a patient and to reduce an operation time of the surgery.

As illustrated in FIG. 5, in a modified example of partial region extraction processing by the partial region extraction means 15, for example, a part of an organ, and the part belonging to the inside of the elliptic parabolic surface 53 that circumscribes the set enclosing body 52 may be extracted as the partial region. Alternatively, a part of an organ, and the part belonging to the inside of the circular conic surface 53A that circumscribes the set enclosing body 52 may be extracted as the partial region. Further, each of a part of an organ, and the part belonging to the inside of the elliptic parabolic surface 53 and a part of an organ, and the part belonging to the inside of the circular conic surface 53A, may be calculated, and one of the calculated parts of the organ may be extracted as the partial region.

As described above, each of a part of an organ, and the part belonging to the inside of the elliptic parabolic surface 53 that circumscribes the set enclosing body 52 and a part of an organ, and the part belonging to the inside of the circular conic surface 53A that circumscribes the set enclosing body 52, may be calculated, and one of the calculated parts of the organ may be extracted as the partial region. In such a case, the partial region extraction means 15 may calculate, as the partial region 54, a region belonging to the inside of the elliptic parabolic surface 53 or the circular conic surface 53A, and the region having a smallest volume or surface area. Plural elliptic parabolic surfaces 53 and circular conic surface 53A circumscribing the enclosing body 52 are calculated by using a known method, and the volume of the part of the organ, and the part belonging to the inside of the elliptic parabolic surface 53 or circular conic surface 53A, is calculated for each of the elliptic parabolic surfaces 53 and circular conic surfaces 53A (or the area of a boundary surface between the part of the organ, and the part belonging to the rotation paraboloid surface, and the rotation paraboloid surface is calculated). Further, a part of the organ that belongs to the inside of the elliptic parabolic surface 53 or the circular conic surface 53A, and that has a smallest volume may be determined as the partial region 54. In such a case, one of the partial region based on the circular conic surface 53A and the partial region based on the elliptic parabolic surface 53 that has a smaller volume of the part of the organ may be determined as the partial region 54 (or, a partial region having a smaller area of a boundary surface between the part of the organ, and the part belonging to the inside of the rotation paraboloid surface, and the rotation paraboloid surface may be determined as the partial region 54).

Figure 10:
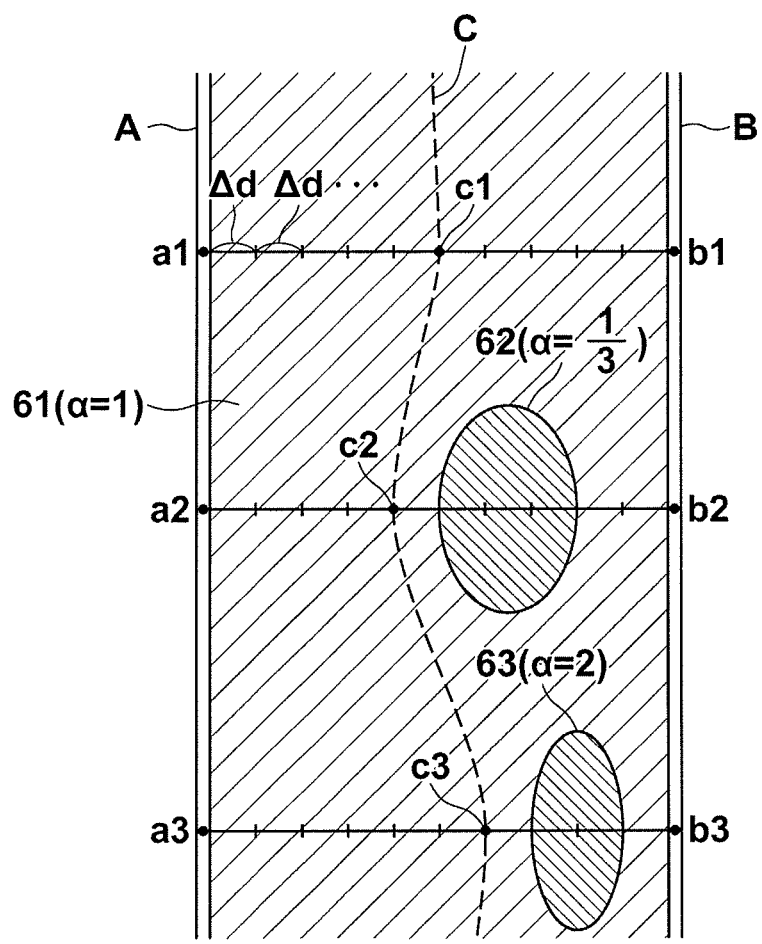
FIG. 10 is a diagram for explaining a modified example of a dominance region extraction process in an embodiment of the present invention.

FIG. 10 is a diagram for explaining a modified example of dominance region extraction processing in the present embodiment. In the modified example of dominance region extraction processing of the present embodiment, for example, the medical image obtainment means 11 further obtains a functional image representing a function level at each position of the organ, as disclosed in Japanese Patent Application No. 2010-180143, which was filed by FUJIFILM Corporation. The dominance region extraction means 19 may extract the dominance region by using a distance weighted based on a function level at each position on a shortest path between each part of the organ and a part of a structure extending from a predetermined position in the region of the structure toward the part of the organ including the abnormal region 51.

In the method disclosed in Japanese Patent Application No. 2010-180143, which was filed by FUJIFILM Corporation, the medical image obtainment means 11 obtains both of a three-dimensional anatomical image 7 and a three-dimensional functional image 8. First, the dominance region extraction means 19 performs positioning (registration) on the three-dimensional anatomical image 7 and the three-dimensional functional image 8 with respect to each other. In the following descriptions, a liver is used as an example. Positioning of the liver region is performed on the three-dimensional anatomical image 7 and the three-dimensional functional image 8 with respect to each other by using a known rigid body or non-rigid body registration method. Further, the direction of movement and the amount of movement of each voxel between the two images are obtained, and the coordinate value of the liver region extracted in the three-dimensional functional image 8 is converted by using the direction of movement and the amount of movement. Accordingly, these images can represent information at the same position of the liver region when the coordinate value is the same.

Further, the dominance region extraction means 19 determines a region (dominance region) dominated by a blood vessel. In this case, the dominance region in the liver that is dominated by each blood vessel present in the inside of the liver is obtained by judging that each point in the region (liver parenchyma) in the liver region other than the blood vessel is dominated by a blood vessel located at a shortest distance from the respective points, and the distance is weighted based on a function level at each position on shortest paths from respective points.

Next, with reference to FIG. 10, a method for determining a boundary between dominance regions of two blood vessels A, B that are next to each other will be specifically described. Here, to simplify explanation, a case in which two blood vessels A, B are parallel to each other and the diameters of the blood vessels A, B are the same will be described. In this case, each path connecting point an to point bn (n=1, 2, 3 . . . ) is perpendicular to the main axis directions of the blood vessels A, B. Point cn, which is a boundary point between the dominance regions of the blood vessels A, B, is obtained on each of the paths by using the following formula (2). Here, $\alpha$ is a function level at each position on a shortest path. Plural boundary points obtained by this processing represent boundary line C between the dominance regions of the blood vessels A, B.

[Formula 2]

$$\int_{a_n}^{c_n} \alpha \cdot \Delta d = \int_{b_n}^{c_n} \alpha \cdot \Delta d \qquad (2)$$

FIG. 10 is a diagram illustrating a specific example of boundary point cn determined in three paths connecting point an to point bn (n=1, 2, 3), in which the distributions of the function level at each position on the respective paths are different from each other. In FIG. 10, function level $\alpha$ at each position of a region 61 is 1, function level $\alpha$ at each position of a region 62 is ⅓, and functional level α at each position of region 63 is 2. As illustrated in FIG. 10, the width of a dominance region (a distance from the center line of a blood vessel to a boundary of a dominance region of the blood vessel) depends on the distribution of function levels in the vicinity of the dominance region. Specifically, the width of the dominance region is wide when functional level α in the vicinity of the dominance region is low. In contrast, the width of the dominance region is narrow when functional level α in the vicinity of the dominance region is high.

By performing the processing as described above, a boundary line of the dominance region is determined. As illustrated in FIG. 10, a dominance region dominated by a structure that is present in the inside of the organ is determined. The obtained processing result is stored in the memory.

In the above case, it is possible to appropriately set a dominance region based on the function level of the organ. Therefore, when the dominance region is determined as the excision region, it is possible to automatically set a more appropriate excision region. Further, a doctor or a radiographer can easily set a region of an organ that should be actually removed.

Further, in the surgery-assistance apparatus 1 in each of the embodiments, it is desirable that the organ region extraction means 12 displays an extracted organ region on a display screen of a display device, and detects an operation performed by a user on the display screen, and updates the organ region based on the detected operation. It is desirable that the structure region extraction means 18 displays an extracted structure region on the display screen of the display device, and detects an operation performed by a user on the display screen, and corrects the extracted structure region based on the detected operation. Further, it is desirable that the partial region extraction means 15 displays the extracted partial region on the display screen of the display device, and detects an operation performed by a user on the display screen, and corrects the extracted partial region based on the detected operation. Further, it is desirable that the dominance region extraction means 19 displays an extracted dominance region on the display screen of the display device, and detects an operation performed by a user on the display screen, and corrects the extracted dominance region based on the detected operation. Further, it is desirable that the excision region determination means 16 displays the determined excision region on the display screen of the display device, and detects an operation performed by a user on the display screen, and updates the excision region based on the detected operation. Further, when the organ region or the structure region or the partial region or the dominance region is corrected, it is desirable that the excision region determination means 16 determines an excision region and a non-excision region based on the corrected organ region, the corrected structure region or the like. Such processing is desirable because the image quality of a three-dimensional anatomical image is low in some cases, and in such a case, it is impossible to accurately extract or estimate a region by a computer.

In each of the embodiments, the surgery-assistance apparatus 1 is realized by installing each program in a computer. Alternatively, programs may be installed in plural computers in a distributed manner to configure a surgery-assistance system that has a function similar to the surgery-assistance apparatus 1.

In each of the embodiments, the surgery-assistance apparatus 1 may include a means for outputting a print or data (recording data in a medium, such as a CD-R and DVD, or transferring data through a network), besides outputting data on a display. Specifically, in the present invention, the manner of outputting an index value or the like is not limited to output on a display.

In each of the embodiments, a case in which the organ is a liver and a main bifurcation is a portal vein is used as an example. However, the present invention is not limited to assistance in a surgery of a liver. The present invention is applicable to assistance in a surgery of other organs, such as a lung.

When the apparatus disclosed in the embodiment of the present invention does not include the structure region extraction means 18 and the dominance region extraction means 19, the excision region determination means 16 determines the partial region extracted by the partial region extraction means 15 as the dominance region.

The present invention is not limited to the embodiments of the present application, and various modifications are possible without departing from the gist of the present invention.

What is claimed is:

1. A surgery-assistance apparatus that determines an excision region including an abnormal region of an organ to be removed, the apparatus comprising:
    a non-transitory computer readable medium storing computer-executable instructions; and
    a processor executing the instructions comprising:
        obtaining a medical image representing the organ;
        extracting a region of the organ from the obtained medical image;
        extracting the abnormal region from the extracted region of the organ;
        setting a smallest enclosing body that encloses the extracted abnormal region;
        extracting, as a partial region, a part of the organ, and the part belonging to the inside of an elliptic parabolic surface or a circular conic surface that circumscribes the set enclosing body;
        extracting a region of a structure dominating the organ from the obtained medical image;
        extracting, as a dominance region, a part of the organ, and the part including the abnormal region and being dominated by a part of the structure extending from a predetermined position in the extracted region of the structure toward the part of the organ including the abnormal region; and
        determining, based on a predetermined excision region determination condition, the partial region or the dominance region, as the excision region.

2. The surgery-assistance apparatus, as defined in claim 1, wherein the processor determining the excision region further comprises:
    weighting the partial region and the dominance region in such a manner to give a priority to the partial region when a distance from a predetermined point present in the abnormal region to a surface of the region of the organ is less than or equal to a predetermined threshold value, and
    weighting the partial region and the dominance region in such a manner as to give a priority to the dominance region when the distance from the predetermined point present in the abnormal region to the surface of the region of the organ is greater than the predetermined threshold value.

3. The surgery-assistance apparatus, as defined in claim 1, wherein the processor determining the excision region further comprises:

weighting the partial region and the dominance region in such a manner as to give a priority to one of the partial region and the dominance region that has a smaller volume or surface area.

4. The surgery-assistance apparatus, as defined in claim 1, wherein the processor determining the excision region further comprises weighting the partial region and the dominance region in such a manner so as to give a priority to the dominance region when the partial region encloses the structure.

5. The surgery-assistance apparatus, as defined in claim 1, wherein the process calculates, as the partial region, a region belonging to the inside of the elliptic parabolic surface or the circular conic surface that circumscribes the set enclosing body, and the volume or the surface area of the region being smallest.

6. The surgery-assistance apparatus, as defined in claim 1, wherein the processor is configured to extract a plurality of abnormal regions, and
wherein the processor is configured to set a smallest enclosing body that encloses at least two of the extracted plurality of abnormal regions that are located within a predetermined distance from each other when the at least two of the extracted plurality of abnormal regions are located within the predetermined distance.

7. The surgery-assistance apparatus, as defined in claim 1, wherein the processor is further configured to
issue an alert when the structure is present in the extracted partial region.

8. The surgery-assistance apparatus, as defined in claim 1, wherein the processor is further configured to obtain a functional image representing a function level at each position of the organ, and
wherein the processor is further configured to extract the dominance region by using a distance weighted based on the function level at each position on a shortest path between each part of the organ and the part of the structure extending from a predetermined position in the extracted region of the structure toward the part of the organ including the abnormal region in the medical image.

9. The surgery-assistance apparatus, as defined in claim 1, wherein the processor is configured to obtain the medical images representing a liver, as the organ, and wherein the processor is configured to extract the region of a blood vessel, as the structure that dominates the liver in one of the obtained medical images.

10. The surgery-assistance apparatus, as defined in claim 1, wherein the processor is configured to obtain the medical images representing a lung, as the organ, and wherein the processor is configured to extract the region of a bronchus, as the structure that dominates the lung in one of the obtained medical images.

11. A surgery-assistance method that determines an excision region including an abnormal region of an organ to be removed, the method comprising:

obtaining a medical image representing the organ;
extracting a region of the organ from the obtained medical image;
extracting the abnormal region from the extracted region of the organ;
setting a smallest enclosing body that encloses the extracted abnormal region;
extracting, by a computer, as a partial region, a part of the organ, and the part belonging to the inside of an elliptic parabolic surface or a circular conic surface that circumscribes the set enclosing body;
extracting, by the computer, a region of a structure dominating the organ from the obtained medical image;
extracting, by the computer, as a dominance region, a part of the organ, and the part including the abnormal region and being dominated by a part of the structure extending from a predetermined position in the extracted region of the structure toward the part of the organ including the abnormal region; and
determining, by the computer, based on a predetermined excision region determination condition, the partial region extracted by the partial region extraction unit or the dominance region extracted by the dominance region extraction unit, as the excision region; and displaying the determined partial region on a display.

12. A non-transitory computer-readable recording medium storing therein a surgery-assistance program that determines an excision region including an abnormal region of an organ to be removed, the program comprises a plurality of computer-executable instructions, wherein the instructions comprise:

obtaining a medical image representing the organ;
extracting a region of the organ from the obtained medical image;
extracting the abnormal region from the extracted region of the organ;
setting a smallest enclosing body that encloses the extracted abnormal region;
extracting, as a partial region, a part of the organ, and the part belonging to the inside of an elliptic parabolic surface or a circular conic surface that circumscribes the set enclosing body;
extracting a region of a structure dominating the organ from the obtained medical image;
extracting, as a dominance region, a part of the organ, and the part including the abnormal region and being dominated by a part of the structure extending from a predetermined position in the extracted region of the structure toward the part of the organ including the abnormal region; and
determining, based on a predetermined excision region determination condition, the partial region or the dominance region, as the excision region.

* * * * *